US012036936B2

(12) United States Patent
Mead

(10) Patent No.: US 12,036,936 B2
(45) Date of Patent: Jul. 16, 2024

(54) PEDAL ASSEMBLY WITH INTEGRATED DISABLE SWITCH AND SYSTEM USING SAME

(71) Applicant: Alexander Jeffrey Mead, Watsonville, CA (US)

(72) Inventor: Alexander Jeffrey Mead, Watsonville, CA (US)

( * ) Notice: Subject to any disclaimer, the term of this patent is extended or adjusted under 35 U.S.C. 154(b) by 0 days.

(21) Appl. No.: 17/493,854

(22) Filed: Oct. 5, 2021

(65) Prior Publication Data

US 2023/0108780 A1    Apr. 6, 2023

(51) Int. Cl.
*B60R 21/09* (2006.01)
*F02D 41/12* (2006.01)
*G05G 1/327* (2008.04)

(52) U.S. Cl.
CPC ............ *B60R 21/09* (2013.01); *F02D 41/123* (2013.01); *G05G 1/327* (2013.01)

(58) Field of Classification Search
CPC ............ G05G 1/30; G05G 1/32; G05G 1/323; G05G 1/327; G05G 1/36; G05G 1/44; G05G 1/445; G05G 1/46; B60T 7/065; B60R 21/09; B60L 3/02
See application file for complete search history.

(56) References Cited

U.S. PATENT DOCUMENTS

| 4,192,399 A * | 3/1980 | Otteson .................. B60K 31/02 200/61.89 |
| 6,101,896 A * | 8/2000 | Engelgau ................ G05G 1/30 74/560 |
| 10,802,529 B1 * | 10/2020 | Kim ........................ B60R 21/09 |
| 2004/0089490 A1 * | 5/2004 | Yamanoi ................. B60R 22/48 180/271 |
| 2010/0037725 A1 * | 2/2010 | Andersson ............... G05G 1/32 74/512 |
| 2012/0111138 A1 * | 5/2012 | Slade ....................... G05G 1/46 248/300 |
| 2012/0205177 A1 * | 8/2012 | Jackson ............... B60K 28/063 180/277 |

(Continued)

FOREIGN PATENT DOCUMENTS

FR     2889138 A1 *   2/2007   ............. B60R 21/09

OTHER PUBLICATIONS

Machine Translation of FR 2889138.*

*Primary Examiner* — Thomas C Diaz
(74) *Attorney, Agent, or Firm* — Michael A. Guth

(57) ABSTRACT

A pedal assembly with integrated disable switch for turning off the engine of an automobile or other motorized transport which may be activated by the driver's foot. The disable switch may be triggered by the raising of the foot while in place on the accelerator pedal. The disable switch may include detent positions including a first detent position which allows for engine function, and a second detent position after activation of the disable functionality such that the switch is not easily deactivated once activated. The disable switch may comprise a switch lever arm above the driver's foot, which is coupled to the main accelerator pedal extension lever. The disable switch may include a mechanically activated switch which is activated by relative motion of the switch lever arm relative to the main accelerator pedal extension lever.

17 Claims, 12 Drawing Sheets

(56) References Cited

U.S. PATENT DOCUMENTS

| | | | |
|---|---|---|---|
| 2013/0338894 A1* | 12/2013 | Olofsson | B60T 7/042 |
| | | | 701/70 |
| 2015/0135887 A1* | 5/2015 | Kim | B60T 7/065 |
| | | | 74/512 |
| 2017/0008499 A1* | 1/2017 | Tsuchiya | G05G 1/30 |
| 2018/0111590 A1* | 4/2018 | Kim | G05G 1/30 |

* cited by examiner

US 12,036,936 B2

PEDAL ASSEMBLY WITH INTEGRATED DISABLE SWITCH AND SYSTEM USING SAME

BACKGROUND

Field of the Invention

The present invention relates to automotive components, and more specifically to a pedal assembly with an ignition disable switch.

Description of Related Art

In the sport of automobile racing, circumstances may occur where it is desired to turn off the ignition of the vehicle while maintaining steering control. For example, if a driver is fighting for control of the vehicle, but expects that the end result is going to be a collision, the driver may desire to turn the engine off pre-emptively. The driver may desire to turn off the ignition while continuing to use both hands on the steering wheel. In another example, the driver may have already experienced a collision and may desire to turn off the ignition of the vehicle. In either circumstance, a running engine, or even a runaway engine, may present a dangerous situation after a collision. In another circumstance, a driver may desire to turn off the ignition of the vehicle if the throttle of the vehicle hangs up in an open position.

What is called for is a foot operated disable switch which allows the driver to turn off the engine of the vehicle without the removal of the driver's hands from the steering wheel. What is also called for is a disable switch that allows for operation of the switch without the driver having to move a foot to a new location.

SUMMARY OF THE INVENTION

A pedal assembly with integrated disable switch for turning off the engine of an automobile or other motorized transport which may be activated by the driver's foot. The disable switch may be triggered by the raising of the foot while in place on the accelerator pedal. The disable switch may include detent positions including a first detent position which allows for engine function, and a second detent position after activation of the disable functionality such that the switch is not easily deactivated once activated. The disable switch may comprise a switch lever arm above the driver's foot, which is coupled to the main accelerator pedal extension lever. The disable switch may include a mechanically activated switch which is activated by relative motion of the switch lever arm relative to the main accelerator pedal extension lever.

DETAILED DESCRIPTION

Figure 1:
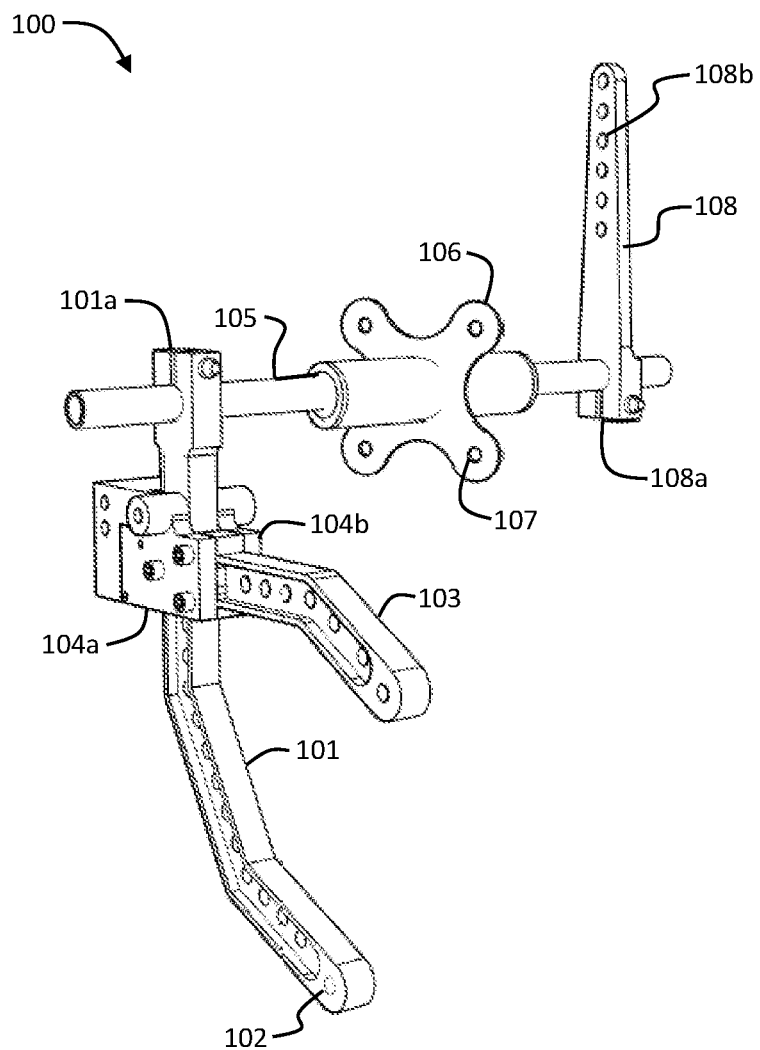
FIG. 1 is a perspective view of pedal assembly with integrated disable switch according to some embodiments of the present invention.
Figure 2:
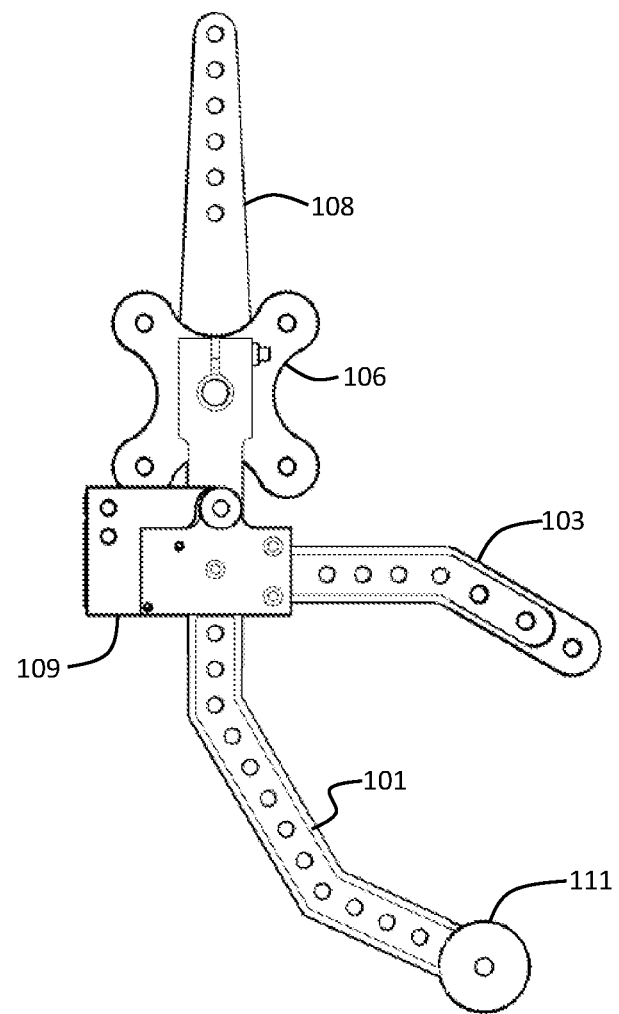
FIG. 2 is a perspective view of a pedal assembly with integrated disable switch according to some embodiments of the present invention.
Figure 3:
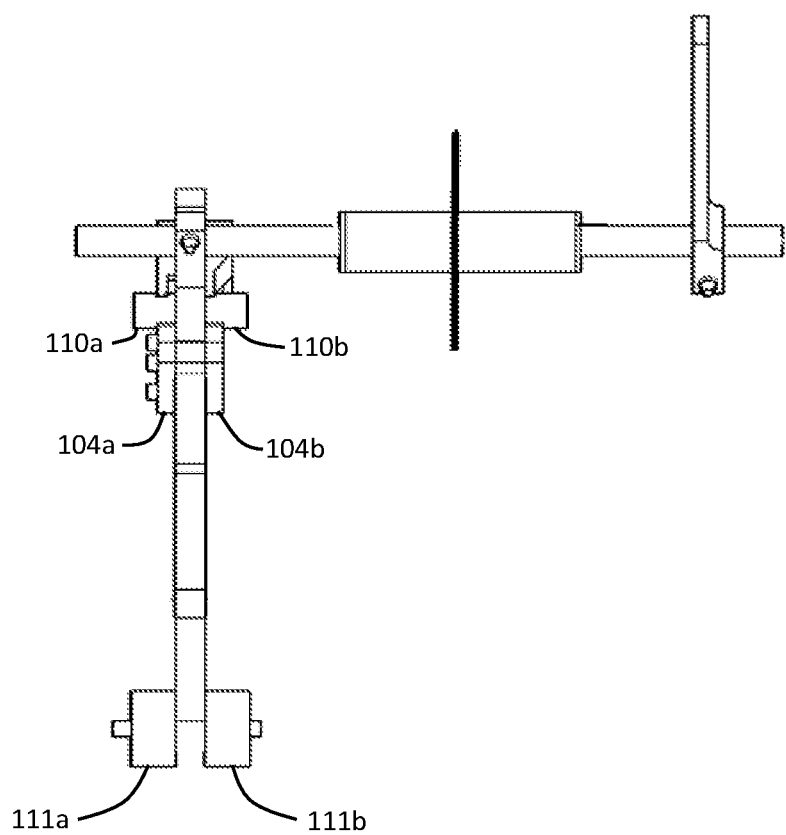
FIG. 3 is a front view of pedal assembly with integrated disable switch according to some embodiments of the present invention.

In some embodiments of the present invention, as seen in FIGS. 1, 2, and 3, a pedal assembly with integrated disable switch 100 is adapted to allow a driver of a vehicle to disable the engine using the foot which is pressing the accelerator. A main pedal arm 101 rotates around a pedal shaft 105, and is depressed at a lower end by the user to accelerate the vehicle. The main pedal arm 101 is affixed to the pedal shaft 105 at or a near a first end of the pedal shaft with a main arm clasp 101a at the upper end of the main arm 101. In some aspects, the main arm clasp may have an expandable hole which can be compressed down with a fastener to affix the main pedal arm 101 to the pedal shaft 105.

The pedal shaft support 106 is mounted to an interior panel of the vehicle and is attached with a mounting flange 107. The shaft support 106 may include an extended support barrel 106b which envelops the pedal shaft 105. The support barrel 106b may include a bushing or barrel along its inner periphery which rotatably supports the pedal shaft 105. A lever 108 is attached to the pedal shaft 105 at or near a second end of the pedal shaft. The lever 108 is affixed to the pedal shaft 105 with a lever clasp 108a. A series of holes 108b function as a lever interface to the engine power system, such as a carburetor linkage or similarly functioning item. In some aspects, a roller assembly 111 is rotatably coupled to a lower end of the main arm 101. A left roller 111a and right roller 111b may be coupled to a roller shaft which extends through a bore in the main arm 101.

A switching arm 103 is coupled to the main arm 101 along its middle section, which may be an upper portion of the middle section. A left side plate 104a and a right side plate 104b are coupled to a left side and a right side of the main pedal arm 101, respectively. The main pedal arm 101 may extend forward from the upper middle section of the main pedal arm 101, and may be rigidly coupled to the left side plate 104a and the right side plate 104b. The left side plate 104a and the right side plate 104b may be pivotably coupled to the main pedal arm 101, allowing the switching arm to be moved by the driver's foot from a stowed, lower, position to a deployed, higher, position. As discussed further below, the stowed and deployed positions of the switching arm may be maintained by detent features.

Figure 4:
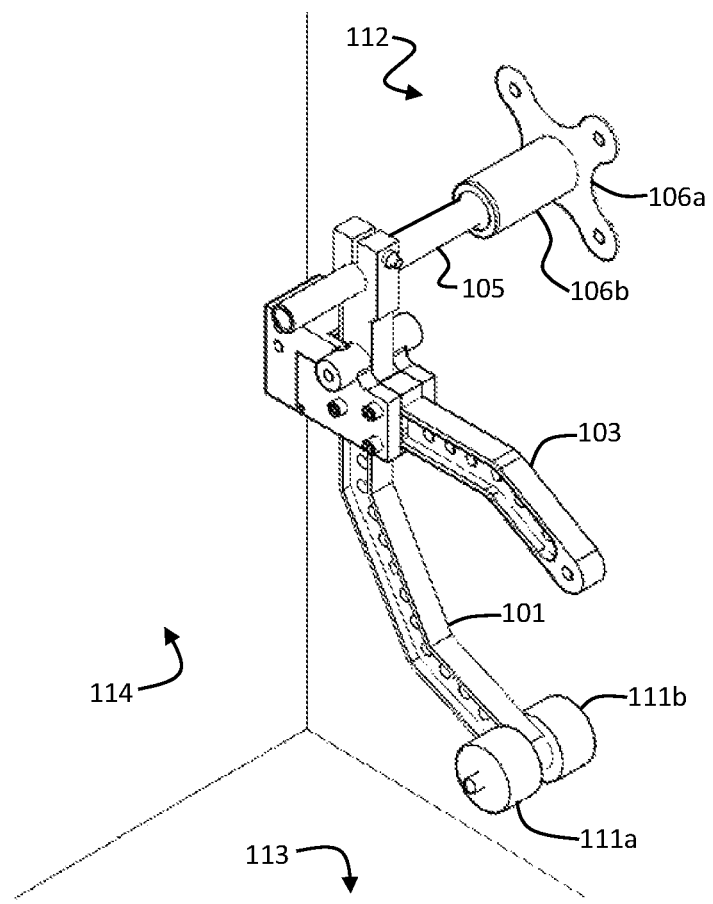
FIG. 4 is a view of an installed pedal assembly with integrated disable switch according to some embodiments of the present invention.
Figure 5:
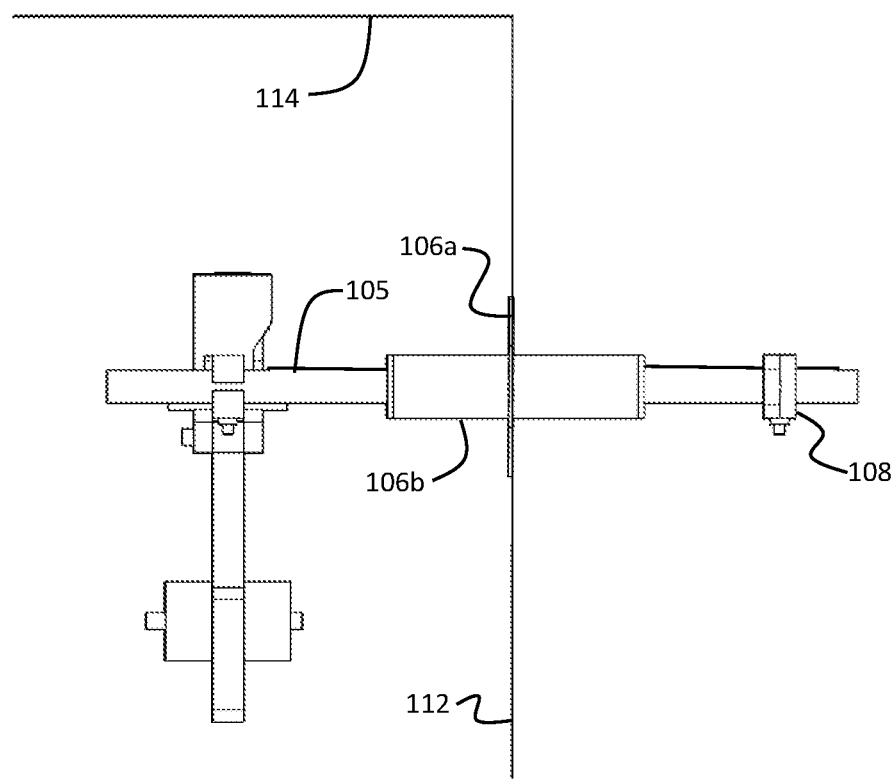
FIG. 5 is a top view of an installed pedal assembly with integrated disable switch according to some embodiments of the present invention.

FIGS. 3 and 4 illustrates a pedal assembly with integrated disable switch 100 mounted to the interior of a vehicle according to some embodiments of the present invention. Using an example representative of the interior of a racing vehicle, the pedal assembly with integrated disable switch 100 is mounted to an interior side firewall 112. The mounting flange 107 may be mounted to an interior facing portion of the interior side firewall 112, with the mounting flange support barrel traversing through the side firewall 112. The lever 108 is outside of the driver's compartment and available to be coupled to the accelerator linkage, or similar mechanical apparatus.

The driver's foot may partially reside on the rollers 111a, 111b, which are just above the floor 113. Forward of the pedal assembly 100 is the front fire wall 114. As may be envisioned in the view of FIG. 4, the driver's foot resides above the main arm 101 and rollers 111a, 111b. In order the accelerate the vehicle, the drive would push downward on the rollers, which would cause a rotation of the pedal shaft 105. In the case of an emergency wherein the driver desires to kill the engine, the driver can raise their foot to engage the switching arm 103. As discussed further below, the switching arm 103 is nominally held in a regular, stowed, position with a detent device such that the switching arm is somewhat fixed. The upward pressure from the driver's foot may then move the switching arm 103 such that it rotates around a pivot which couples the switching arm 103 to the main arm 101. The upward pressure from the driver's foot is sufficient to overcome the detent which has been holding the switching arm 103 in the stowed position. The switching arm 103 then rotates upward to a deployed position, which then is held in that deployed position by the detent device. The movement of the switching arm will then cause the vehicle engine to shut off, reducing the risks associated with the event facing the driver.

Figure 6:
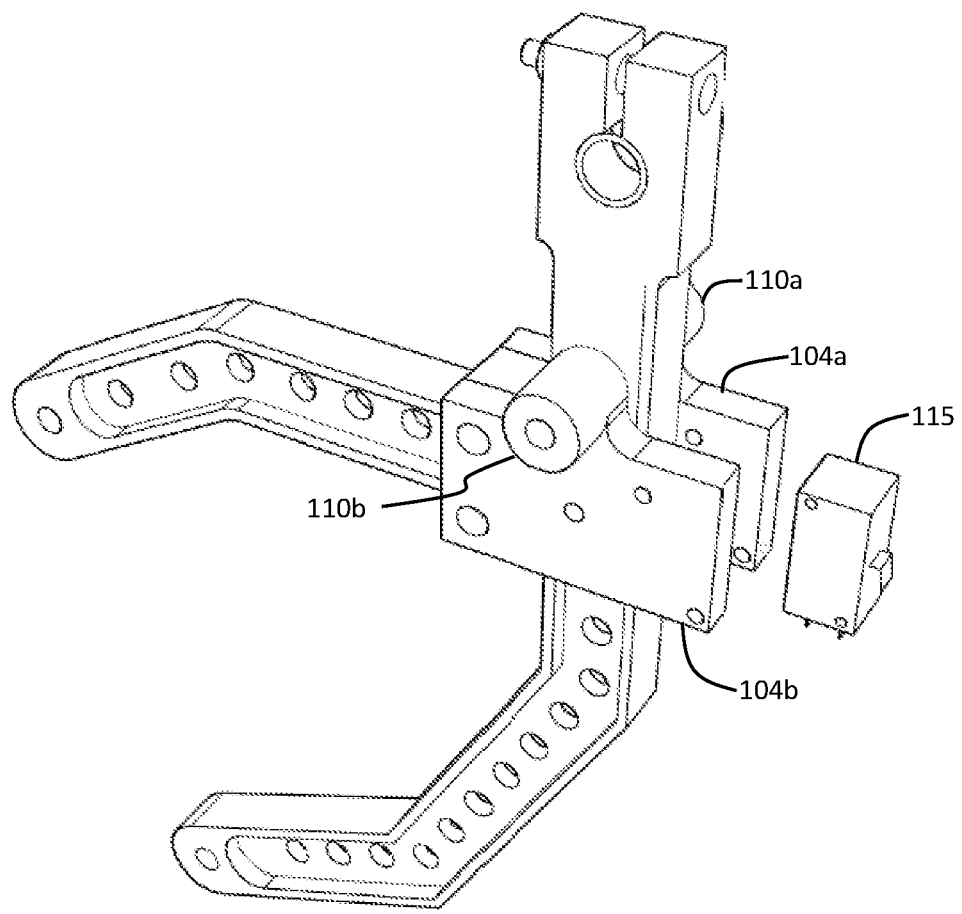
FIG. 6 is a perspective view of a pedal subassembly according to some embodiments of the present invention.
Figure 7:
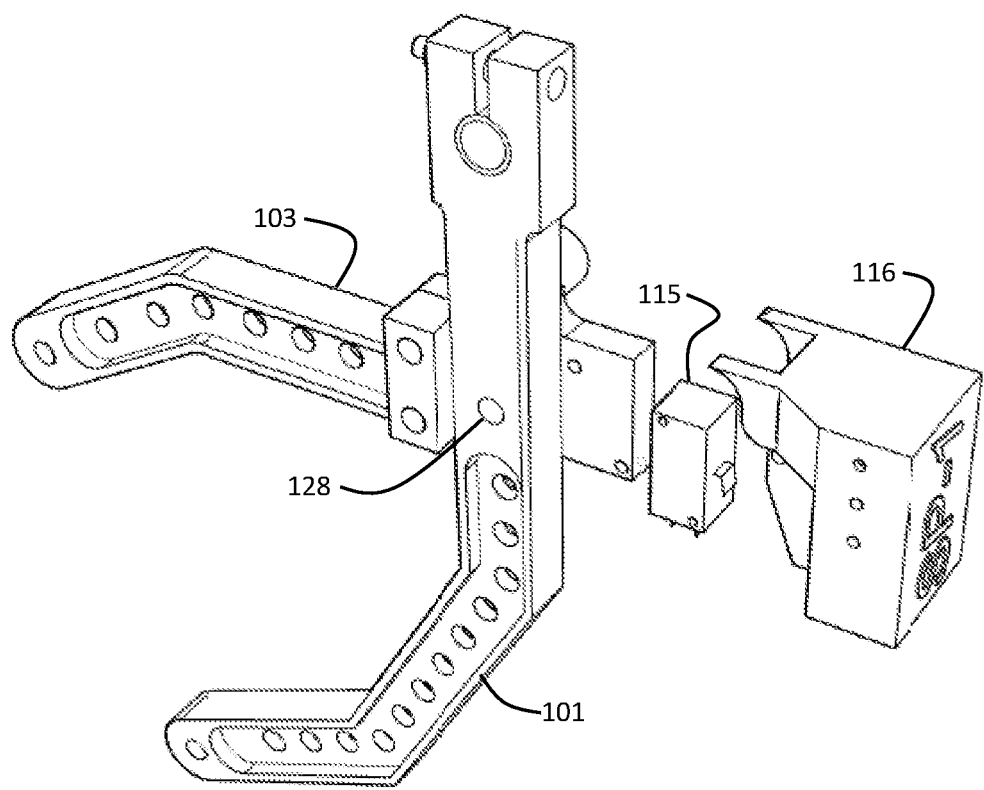
FIG. 7 is a perspective view of a pedal subassembly according to some embodiments of the present invention.

FIGS. 6 and 7 illustrate aspects of the system in partial exploded view. The switching arm 103 is pivotally coupled to the main arm 101 via the rigid coupling of the switching arm to the left side plate 104a and the right side plate 104b. The main arm 101 has a pivot bore 128 around which the side plates and switching arm rotate. The left side plate 104a and the right side plate 104b couple to the switching arm, which when lifted then rotates the left side plate 104a and the right side plate 104b around the pivot 128, and which also then moves the switch assembly 115. The switch assembly 115 is rigidly coupled to the left side plate 104a and the right side plate 104b. A switch button on the switch assembly 115 is depressed by the back of the main arm 101 as the switch assembly is repositioned as the switching arm 103 is raised into the deployed position. A rear cover 116 protects the switch assembly. The rear cover 116 may also have indicator lights which indicate the switch position.

Figure 8:
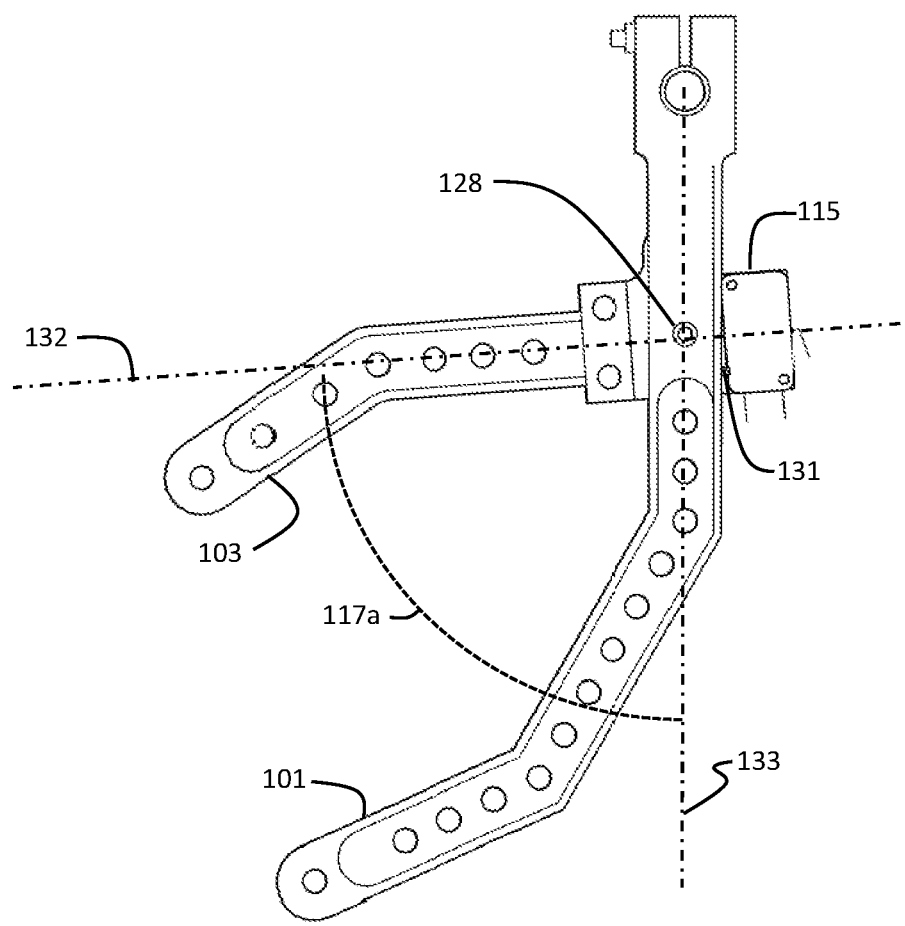
FIG. 8 is a side view of a pedal assembly with integrated disable switch in a stowed position according to some embodiments of the present invention.
Figure 9:
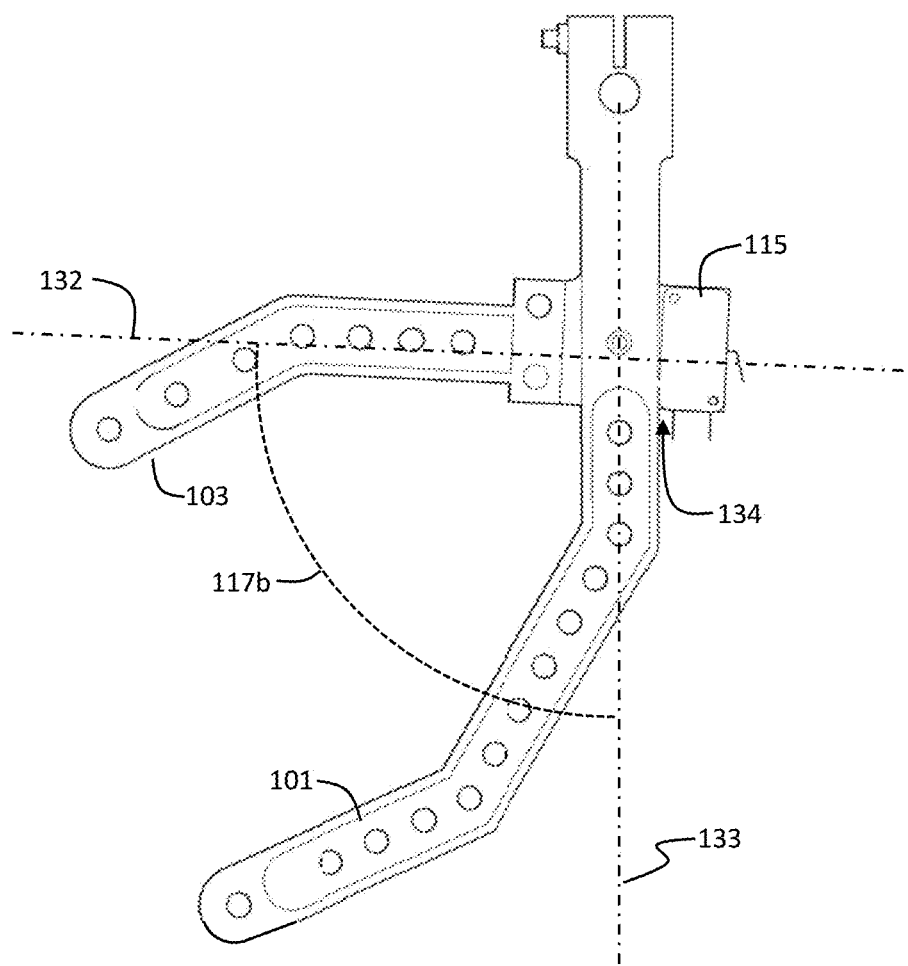
FIG. 9 is a side view of a pedal assembly with integrated disable switch in a deployed position according to some embodiments of the present invention.

FIGS. 8 and 9 illustrate, in partial assembly views, the stowed and deployed positions of the pedal assembly, respectively. A main axis 133 runs down the main arm 101 through the center of the pedal shaft and through the pivot 128. A switching arm axis 132 runs down the center line of the upper portion of the switching arm 103 and through the pivot 128. In a stowed position of the assembly, as seen in FIG. 8, the switching arm 103 is held by a detent device at a stowed angle 117a between the main axis 133 and the switching arm axis 132. In this stowed position, the switch actuator 131 of the switch assembly 115 is positioned such that the switch actuator is not depressed, or actuated. As seen in FIG. 9, in the deployed position the switching arm 103 has been raised to a deployed position. In the deployed position, the deployed angle 117b between the main axis 133 and the switching arm axis 132 is increased. The switching arm is then held in the deployed position by the detent device. The actuation of the switch assembly 115 may cause the vehicle engine to be turned off In some aspects, electrical wires exit the switch assembly 115 and route out through a firewall to an electronics portion of the vehicle. In a representational embodiment, electrical leads are routed up from the switch assembly 115 and to a device adapted to shut off the engine.

Figure 10:
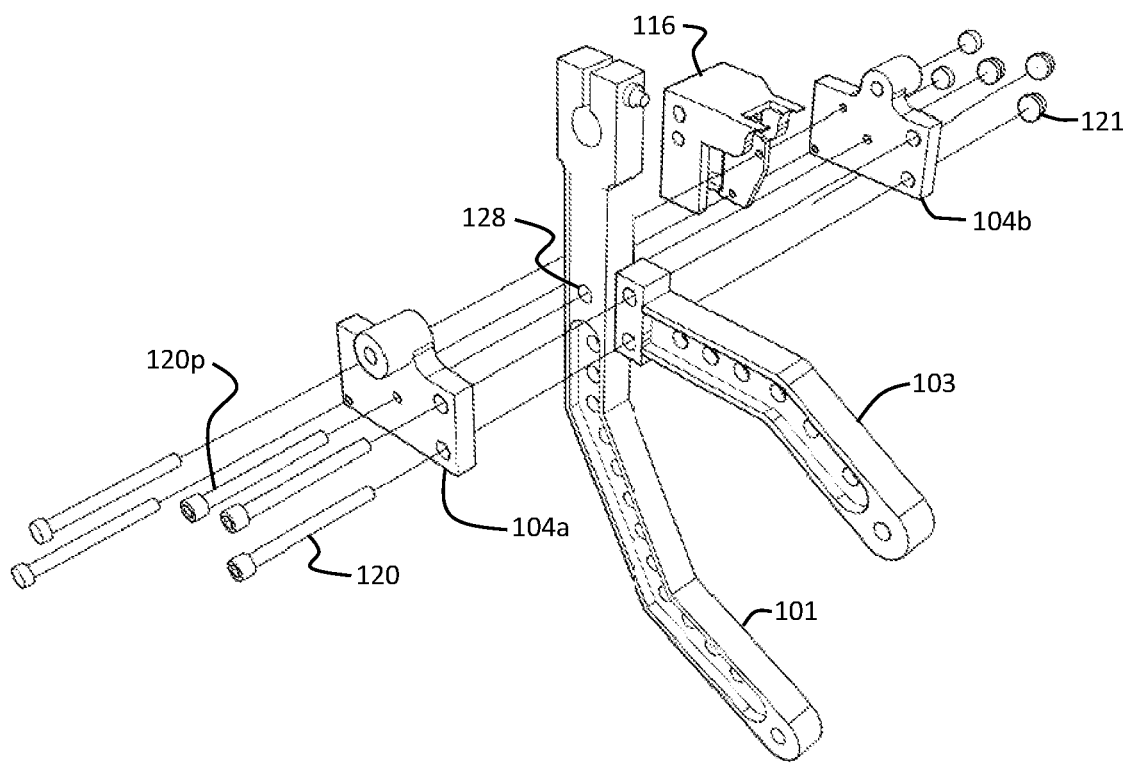
FIG. 10 is an exploded view of a pedal assembly with integrated disable switch according to some embodiments of the present invention.

FIG. 10 illustrates an exploded view of a pedal assembly with integrated disable switch 100 according to some embodiments of the present invention. The switching arm 103 is rigidly coupled to the left side plate 104a and the right side plate 104b with fasteners 120, 121. The switch assembly (not shown) is captured between the rear portions of the left side plate 104a and the right side plate 104b with fasteners 120, 121. The rear cover 116 covers the switch assembly. The plates 104a, 104b, which are rigidly coupled to the switching arm 103, pivot around the pivot 128 of the main pedal arm 101 with a pivot fastener 120p.

Figure 11:
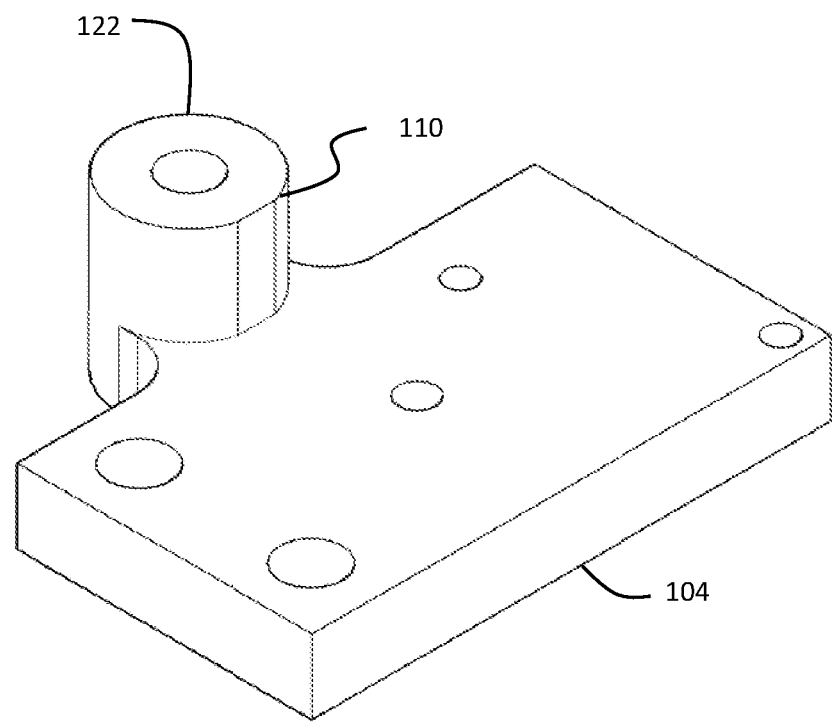
FIG. 11 is a view of side plate according to some embodiments of the present invention.
Figure 12:
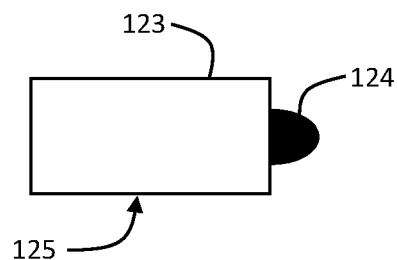
FIG. 12 is a view of a detent assembly according to some embodiments of the present invention.
Figure 13:
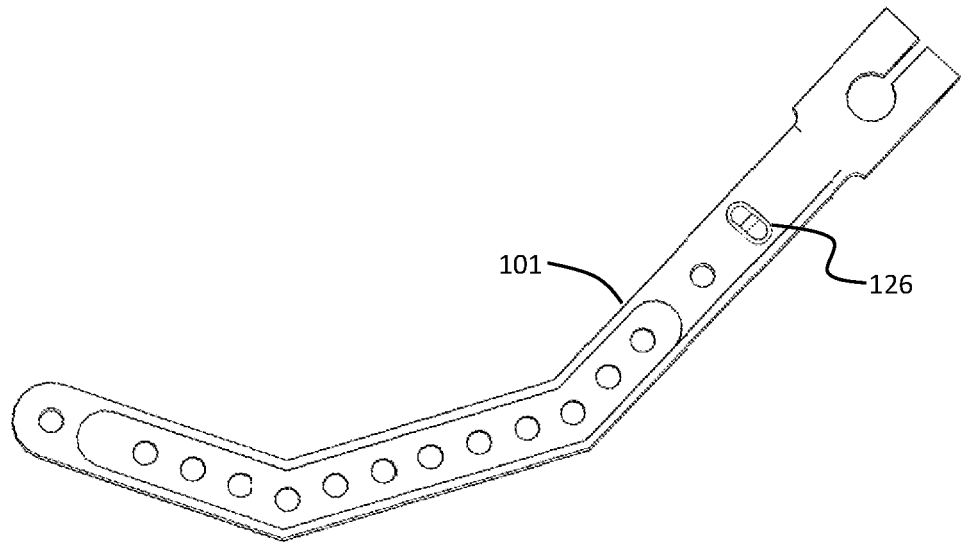
FIG. 13 is a side view of a main pedal arm with detent position according to some embodiments of the present invention.
Figure 14:
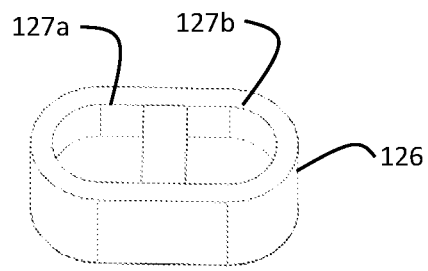
FIG. 14 is a view of a detent position insert according to some embodiments of the present invention.
Figure 15:
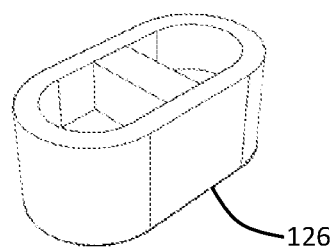
FIG. 15 is a view of a detent position insert according to some embodiments of the present invention.

FIGS. 11 and 12 illustrate aspects of the detent system portion of the left side plate 104a and the right side plate 104b. A side plate 104 has a detent barrel 110 adapted to hold the detent device 123. The detent barrel 110 may have a threaded interior 122 adapted to receive the threaded exterior 125 of the detent device 123. A detent button 124 is spring loaded such that the button extends past the end of the barrel of the detent device 123, but can be pressed back into the interior of the barrel of the detent device when sufficient force is applied. The detent device 123 may be threaded down into the detent barrel 110 until the proper extension of the detent button 124 is achieved. FIGS. 14 and 15 illustrate a detent position insert 126 according to some embodiments of the present invention. As seen in FIG. 13, the detent position insert 26 may reside within the side surface of the main pedal arm 101. In some aspects, a detent position insert 126 may reside on both sides of the main pedal arm 101. The detent position insert 126 may have two recesses, a stowed insert 127a and a deployed inset 127b. The detent button 124 of the detent device 123 is adapted to protrude into the recesses of the detent position insert 126 to hold the switching arm 103 in either the stowed position or the deployed position. The detent button provides sufficient detent force to hold the switching arm 103 but is able to be overcome with the force of the driver's foot raising the switching arm 103.

In an exemplary embodiment, the switch assembly is coupled to an electronics unit adapted to switch off the engine upon activation of the disable switch. In some aspects, the switch assembly may break a connection. In some aspects, the switch assembly may make a connection.

As evident from the above description, a wide variety of embodiments may be configured from the description given herein and additional advantages and modifications will readily occur to those skilled in the art. The invention in its broader aspects is, therefore, not limited to the specific details and illustrative examples shown and described. Accordingly, departures from such details may be made without departing from the spirit or scope of the applicant's general invention.

What is claimed is:

1. A pedal assembly with integrated disable switch, the pedal assembly comprising:
   a main pedal arm, said main pedal arm having a first end and a second end;

a pedal shaft, said pedal shaft fixedly coupled to said first end of said main pedal arm;

a switching arm, said switching arm pivotally coupled to said pedal shaft, said switching arm configured to deploy from a stowed lower position to a deployed raised position, wherein said switching arm protrudes forward from said main pedal arm in the stowed lower position, and wherein said second end of said main pedal arm protrudes forward under said switching arm, thereby creating a space configured to receive a user's foot below said switching arm and above said main pedal arm, wherein said switching arm is configured to deploy by the raising of said user's foot.

2. The pedal assembly with integrated disable switch of claim 1 further comprising an electric switch, said electric switch coupled to said main pedal arm, wherein said electric switch is switched when said switching arm deploys from said stowed lower position to said deployed raised position.

3. The pedal assembly with integrated disable switch of claim 2 further comprising a shaft support rotationally coupled to said pedal shaft.

4. The pedal assembly with integrated disable switch of claim 3 wherein said shaft support comprises:
    a support barrel around the exterior of said pedal shaft; and
    a mounting flange.

5. A pedal assembly with integrated disable switch, assembly comprising:
    a main pedal arm, said main pedal arm having a first end and a second end;
    a pedal shaft, said pedal shaft fixedly coupled said first end of said main pedal arm;
    a switching arm, said switching arm coupled to said pedal shaft, said switching arm configured to deploy from a stowed lower position to a deployed raised position;
    an electric switch, said electric switch coupled to said main pedal arm, wherein said electric switch is switched when said switching arm deploys from said stowed lower position to said deployed raised position;
    a shaft support rotationally coupled to said pedal shaft wherein said shaft support comprises:
        a support barrel around the exterior of said pedal shaft; and
        a mounting flange; and
    a lever, wherein said pedal shaft protrudes past said support barrel of said shaft support and wherein said protruding portion of said pedal shaft is coupled to said lever.

6. The pedal assembly with integrated disable switch of claim 4 further comprising a detent device, said detent device adapted to detent said switching arm in either of said stowed or said deployed positions.

7. The pedal assembly with integrated disable switch of claim 5 further comprising a detent device, said detent device adapted to detent said switching arm in either of said stowed or said deployed positions.

8. The pedal assembly with integrated disable switch of claim 4 further comprising:
    a right side plate, said right side plate comprising a detent barrel; and
    a left side plate, said left side plate comprising a detent barrel; and
    a right side detent device threaded into said detent barrel of said right side plate, said right side detent device comprising a spring loaded detent button; and
    a left side detent device threaded into said detent barrel of said left side plate, said left side detent device comprising a spring loaded detent button, wherein said right side plate and said left side plate are rigidly coupled to switching arm, and wherein said right side plate and said left side plate are pivotally coupled to said main pedal arm, thereby pivotally coupling said switching arm to said main pedal arm.

9. The pedal assembly with integrated disable switch of claim 8 wherein said electric switch is rigidly coupled to said right side plate and said left side plate.

10. The pedal assembly with integrated disable switch of claim 9 wherein said electric switch comprises a switch button, and wherein said switch button is depressed when said switching arm deploys from said stowed lower position to said deployed raised position.

11. The pedal assembly with integrated disable switch of claim 10 further comprising a cover covering said electric switch.

12. The pedal assembly with integrated disable switch of claim 11 wherein said cover comprises one or more indicator lights indicating the switch position status of said electric switch.

13. The pedal assembly with integrated disable switch of claim 5 further comprising:
    a right side plate, said right side plate comprising a detent barrel; and
    a left side plate, said left side plate comprising a detent barrel; and
    a right side detent device threaded into said detent barrel of said right side plate, said right side detent device comprising a spring loaded detent button; and
    a left side detent device threaded into said detent barrel of said left side plate, said left side detent device comprising a spring loaded detent button, wherein said right side plate and said left side plate are rigidly coupled to switching arm, and wherein said right side plate and said left side plate are pivotally coupled to said main pedal arm, thereby pivotally coupling said switching arm to said main pedal arm.

14. The pedal assembly with integrated disable switch of claim 13 wherein said electric switch is rigidly coupled to said right side plate and said left side plate.

15. The pedal assembly with integrated disable switch of claim 14 wherein said electric switch comprises a switch button, and wherein said switch button is depressed when said switching arm deploys from said stowed lower position to said deployed raised position.

16. The pedal assembly with integrated disable switch of claim 15 further comprising a cover covering said electric switch.

17. The pedal assembly with integrated disable switch of claim 16 wherein said cover comprises one or more indicator lights indicating the switch position status of said electric switch.

* * * * *